United States Patent
Uya

[11] Patent Number: 5,847,983
[45] Date of Patent: Dec. 8, 1998

[54] FULL SUBTRACTER

[75] Inventor: Masaru Uya, Osaka, Japan

[73] Assignee: Matsushita Electric Industrial Co., Ltd., Osaka, Japan

[21] Appl. No.: 701,473

[22] Filed: Aug. 22, 1996

[30] Foreign Application Priority Data

Aug. 24, 1995 [JP] Japan .................................. 7-215828

[51] Int. Cl.⁶ .................................................. G06F 7/385
[52] U.S. Cl. ...................................................... 364/784.01
[58] Field of Search .................................. 307/465, 362; 364/760, 768.01, 784; 324/73 R

[56] References Cited

U.S. PATENT DOCUMENTS

| 4,575,674 | 3/1986 | Bass et al. ............................ 324/73 R |
| 4,601,007 | 7/1986 | Uya et al. ............................... 364/784 |
| 4,748,584 | 5/1988 | Noda ..................................... 364/760 |
| 4,767,949 | 8/1988 | Mayweather, III ..................... 307/362 |
| 4,831,578 | 5/1989 | Bui ........................................ 364/784 |
| 4,878,192 | 10/1989 | Nishiyama et al. .................... 364/768 |
| 4,912,345 | 3/1990 | Steele et al. ........................... 307/465 |
| 5,079,450 | 1/1992 | Win et al. .............................. 307/465 |

FOREIGN PATENT DOCUMENTS 63-118934  5/1988  Japan .

*Primary Examiner*—Ayaz R. Sheikh
*Assistant Examiner*—Omar Omar
*Attorney, Agent, or Firm*—McDermott, Will & Emery

[57] ABSTRACT

An improved full subtracter is disclosed which receives a minuend signal A having a weight of +1, a subtrahend signal B having a weight of −1 and a borrow input signal Xi having a weight of −1 and provides a difference output: signal D having a weight of +1 and a borrow output signal Xo having a weight of −2. The full subtracter is composed of CMOS transistors such that both the signal D delay time and the signal Xo delay time are decreased by reducing the number of logic gate stages.

8 Claims, 6 Drawing Sheets

FIG. 3
PRIOR ART

| A | B | Xi | D | Xo |
|---|---|----|---|----|
| 0 | 0 | 0  | 0 | 0  |
| 0 | 0 | 1  | 1 | 1  |
| 0 | 1 | 0  | 1 | 1  |
| 0 | 1 | 1  | 0 | 1  |
| 1 | 0 | 0  | 1 | 0  |
| 1 | 0 | 1  | 0 | 0  |
| 1 | 1 | 0  | 0 | 0  |
| 1 | 1 | 1  | 1 | 1  |

FIG. 5

| A | B | Xi | LOGIC GATE 1 OF FIG. 4 | LOGIC GATE 2 OF FIG. 4 | D |
|---|---|---|---|---|---|
| 0 | 0 | 0 | HIGH IMPEDANCE | 0 | 0 |
| 0 | 0 | 1 |  | 1 | 1 |
| 0 | 1 | 0 | 1 | HIGH IMPEDANCE | 1 |
| 0 | 1 | 1 | 0 |  | 0 |
| 1 | 0 | 0 | 1 |  | 1 |
| 1 | 0 | 1 | 0 |  | 0 |
| 1 | 1 | 0 | HIGH IMPEDANCE | 0 | 0 |
| 1 | 1 | 1 |  | 1 | 1 |

FIG. 6

| A | B | Xi | LOGIC GATE 3 OF FIG. 4 | LOGIC GATE 4 OF FIG. 4 | Xo |
|---|---|---|---|---|---|
| 0 | 0 | 0 | HIGH IMPEDANCE | 0 | 0 |
| 0 | 0 | 1 |  | 1 | 1 |
| 0 | 1 | 0 | 1 | HIGH IMPEDANCE | 1 |
| 0 | 1 | 1 |  | 1 | 1 |
| 1 | 0 | 0 | 0 | 0 | 0 |
| 1 | 0 | 1 |  | HIGH IMPEDANCE | 0 |
| 1 | 1 | 0 | HIGH IMPEDANCE | 0 | 0 |
| 1 | 1 | 1 |  | 1 | 1 |

FIG. 8

| A | B | Xi | LOGIC GATE 1 OF FIG. 7 | LOGIC GATE 2 OF FIG. 7 | D |
|---|---|---|---|---|---|
| 0 | 0 | 0 | 1 | HIGH IMPEDANCE | 0 |
| 0 | 0 | 1 | 0 | | 1 |
| 0 | 1 | 0 | HIGH IMPEDANCE | 0 | 1 |
| 0 | 1 | 1 | | 1 | 0 |
| 1 | 0 | 0 | | 0 | 1 |
| 1 | 0 | 1 | | 1 | 0 |
| 1 | 1 | 0 | 1 | HIGH IMPEDANCE | 0 |
| 1 | 1 | 1 | 0 | | 1 |

FIG. 9

| A | B | Xi | LOGIC GATE 3 OF FIG. 7 | LOGIC GATE 4 OF FIG. 7 | Xo |
|---|---|---|---|---|---|
| 0 | 0 | 0 | HIGH IMPEDANCE | 1 | 0 |
| 0 | 0 | 1 | | 0 | 1 |
| 0 | 1 | 0 | 0 | HIGH IMPEDANCE | 1 |
| 0 | 1 | 1 | | 0 | 1 |
| 1 | 0 | 0 | 1 | 1 | 0 |
| 1 | 0 | 1 | | HIGH IMPEDANCE | 0 |
| 1 | 1 | 0 | HIGH IMPEDANCE | 1 | 0 |
| 1 | 1 | 1 | | 0 | 1 |

FULL SUBTRACTER

BACKGROUND OF THE INVENTION

The present invention relates to an improvement in semiconductor full subtracters.

An array divider of carry save type requires a plurality of full subtracters. In such an array divider, each full subtracter receives a minuend signal A having a weight of +1, a subtrahend signal B having a weight of −1 and a borrow input signal Xi having a weight of −1, thereafter providing a difference output signal D having a weight of +1 and a borrow output signal Xo having a weight of −2. The difference signal D and the borrow output signal Xo for the full subtracter are expressed by the following logical expressions (1) and (2), respectively.

$$D = A \oplus B \oplus Xi \tag{1}$$

$$Xo = \overline{(A \oplus B)} Xi + \overline{A} B = \overline{(A+B)} Xi + \overline{A} B \tag{2}$$

With reference to FIG. 1, an example of the above-described prior art full subtracter is illustrated. This circuit has two NOR gates 100, 102, two AND/NOR composite gates 101, 103, an inverter 104, an OR/NAND composite gate 105 and two NAND gates 106, 107. All of these logic gates are commonly-used CMOS gates. Both a combination of the NOR gate 100 and the AND/NOR composite gate 101 and a combination of the NOR gate 102 and the AND/NOR composite gate 103 function as an EXOR gate.

FIG. 2 illustrates another example of the above-described prior art full subtracter. This full subtracter has a NOR gate 200, an AND/NOR composite gate 201, three NAND gates 202, 207, 208, two OR/NAND composite gates 203, 206, two inverters 204, 205 and two output inverters 209, 210. Like the first example, all of these logic gates are commonly-used CMOS gates. The output inverters 209, 210 are inversion buffers for high drive performance. A combination of the NOR gate 200 and the AND/NOR composite gate 201 functions as an EXNOR gate. A combination of the NAND gate 202 and the OR/NAND composite gate 203 functions as an EXNOR gate. These combinations are well-known ones in the art.

FIG. 3 is a truth table for the full subtracters shown in FIGS. 1 and 2. "0" represents the state of low logic level and "1" represents the state of high logic level. The fact that this truth table is in accordance with the logical expressions (1) and (2) can be proved easily.

The length of processing time, required in a case where input signals (SIGNALS A, B, Xi) are simultaneously supplied to the full subtracter circuit shown in FIG. 1, is explained. SIGNAL D appears in a propagation delay time required for input signal propagation through a total of four gate-stages, i.e., the logic gates 100–103. SIGNAL Xo appears in a propagation delay time required for input signal propagation through a total of three gate-stages, i.e., the gates 104, 105 (106) and 107.

For the case of the FIG. 2 full subtracter, SIGNAL D appears in a propagation delay time required for input signal propagation through a total of five gate-stages, i.e., the gates 200–203 and 209. On the other hand, SIGNAL Xo appears in a propagation delay time required for input signal propagation through a total of four gate-stages, i.e., the gates 204 (205), 206 (207), 208 and 210.

Accordingly, the processing time of the prior art full subtracters of FIGS. 1 and 2 is long.

SUMMARY OF THE INVENTION

Accordingly, it is an object of the present invention to provide an improved full subtracter which is much faster than conventional full subtracters. A fast divider (can be formed of full subtracters made in accordance with the present invention.

More specifically, four composite logic gates are employed in the present invention to provide a fast full subtracter suitable for integrated circuits of carry save type array dividers. The present invention is described by making reference to the accompanying drawings.

BRIEF DESCRIPTION OF THE DRAWINGS

FIG. 3 shows a truth table for the full subtracters shown in FIGS. 1 and 2.

FIG. 5 shows a truth table for the upper half section of the full subtracter shown in FIG. 4.

FIG. 6 shows a truth table for the lower half section of the full subtracter shown in FIG. 4.

FIG. 8 shows a truth table for the upper half section of the full subtracter shown in FIG. 7.

FIG. 9 shows a truth table for the lower half section of the full subtracter shown in FIG. 7.

DETAILED DESCRIPTION OF THE INVENTION

Figure 4:
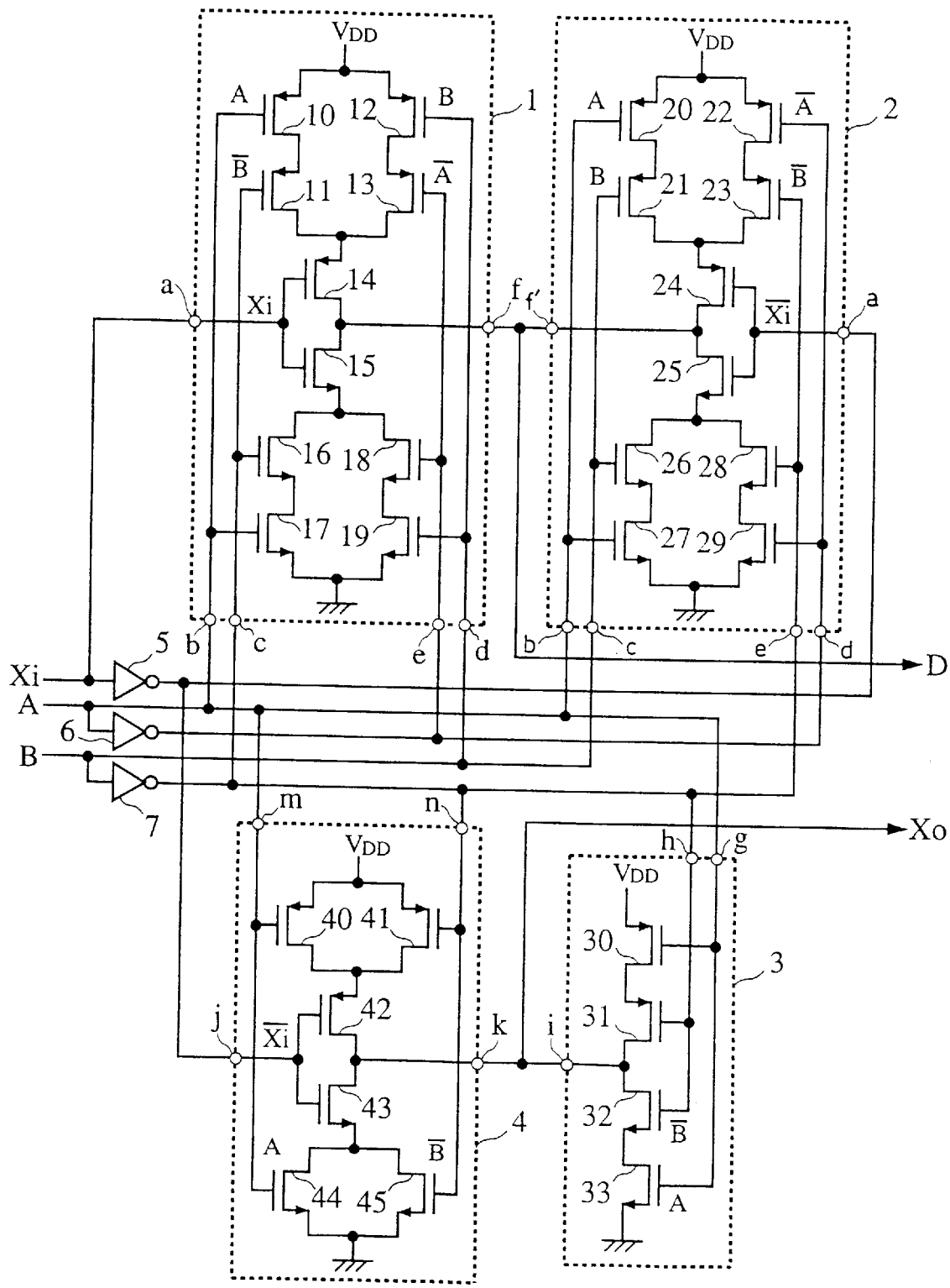
FIG. 4 is a circuit diagram of a full subtracter in accordance with an embodiment of the present invention.

A first embodiment of the present invention is described. FIG. 4 illustrates a circuit of a CMOS full subtracter of the first embodiment which is configured so that the logical expressions (1) and (2) hold. More specifically, this circuit is composed of a first logic gate 1, a second logic gate 2, a third logic gate 3, a fourth logic gate 4 and three CMOS inverters 5, 6, 7 in order that the circuit receives three different signals (a minuend signal A having a weight of +1, a subtrahend signal B having a weight of −1, and a borrow input signal Xi having a weight of −1) and provides two different signals (a difference output signal D having a weight of +1 and a borrow output signal Xo having a weight of −2).

The first logic gate 1 has five input terminals a, b, c, d, e and a single output terminal f. The first logic gate 1 provides, at the output terminal f, a low-logic-level output signal at least either in a first state or in a second state. The first state is the state in which the input terminals a, b, c are in the state of high logic level. The second state is the state in which the input terminals a, d, e are in the state of high logic level. On the other hand, the first logic gate 1 provides, at the output terminal f, a high-logic-level output signal at least either in a third state or in a fourth state. The third state is the state in which the input terminals a, b, c are in the state of low logic level. The fourth state is the state in which the input terminals a, d, e are in the state of low logic level. In different states other than the first to fourth states, the output terminal f is placed into the state of high impedance. The first logic gate 1 is composed of five p-channel MOS (PMOS) transistors 10–14 and five n-channel MOS (NMOS) transistors 15–19. The PMOS transistors 10 and 11 are connected in series to make a first series connection. The PMOS transistors 12 and 13 are connected in series to make a second series connection. These first and second series connections are connected in parallel to form a first parallel circuit. The NMOS transistors 16 and 17 are connected in series to make a third series connection. The NMOS transistors 18 and 19 are connected in series to make a fourth series connection. These third and fourth series connections are connected in parallel to form a second parallel circuit. The PMOS transistor 14 and the NMOS transistor 15 are connected in series to make a fifth series connection. The first parallel circuit, the fifth series connection, and the second parallel circuit are serially connected between a positive power supply terminal $V_{DD}$ and a negative power supply terminal, i.e., ground. The gates of the PMOS transistor 14 and the NMOS transistor 15 are connected in common to the input terminal a and the drains thereof are connected in common to the output terminal f. The input terminals b, c, d and e are connected to the gates of the PMOS transistor 10 and the NMOS transistor 17, to the gates of the PMOS transistor 11 and the NMOS transistor 16, to the gates of the PMOS transistor 12 and the NMOS transistor 19 and to the gates of the PMOS transistor 13 and the NMOS transistor 18, respectively.

The second logic gate 2 is identical in configuration with the first logic gate 1. The second logic gate 2 with five input terminals a, b, c, d, e and a single output terminal f' is composed of five PMOS transistors 20–24 and five NMOS transistors 25–29. The second logic gate 2 functions in substantially the same way as the first logic gate 1.

The third logic gate 3 with two input terminals g, h and a single output terminal i provides a low-logic-level output signal at the output terminal i in a fifth state in which the input terminals g and h are in the state of high logic level. Conversely, the third logic gate 3 provides a high-logic-level output signal at the output terminal i in a sixth state in which the input terminals g and h a:e in the state of low logic level. In different states other than the fifth and sixth states, the output terminal i is placed into the state of high impedance. The third Logic gate 3 is composed of two PMOS transistors 30 and 31 and two NMOS transistors 32 and 33. These four MOS transistors 30, 31, 32 and 33 are serially connected between $V_{DD}$ and ground. The gates of the PMOS transistor 30 and the NMOS transistor 33 are connected to the input terminal g. The gates of the PMOS transistor 31 and the NMOS transistor 32 are connected to the input terminal h. The drains of the PMOS transistor 31 and the NMOS transistor 32 are connected in common to the output terminal i.

The fourth logic gate 4 has three input terminals j, m, n and a single output terminal k. The fourth logic gate 4 provides, at the output terminal k, a low-logic-level output signal, at least either in a seventh state or in an eighth state. The seventh state is the state in which the input terminals j and m are in the state of high logic level. The eighth state is the state in which the input terminals j and n are in the state of high logic level. On the other hand, the fourth logic gate 4 provides, at the output terminal k, a high-logic-level output signal, at least either in a ninth state or in a tenth state. The ninth state is the state in which the input terminal j and m are in the state of low logic level. The tenth state is the state in which the input terminals j and n are in the state of low logic level. In different states other than the seventh to tenth states, the output terminal k is placed into the state of high impedance. The fourth logic gate 4 is composed of three PMOS transistors 40–42 and three NMOS transistors 43–45. The PMOS transistors 40 and 41 make a parallel connection. The NMOS transistors 44 and 45 make a parallel connection. The PMOS transistor 42 and the NMOS transistor 43 make a series connection. These parallel connections and the series connection are serially connected between $V_{DD}$ and ground. The gates of the PMOS transistor 42 and the NMOS transistor 43 are connected in common to the input terminal j and the drains thereof are connected in common to the output terminal k. The input terminals m and n are connected to the gates of the PMOS transistor 40 and the NMOS transistor 44 and to the gates of the PMOS transistor 41 and the NMOS transistor 45, respectively.

With reference to FIG. 4, SIGNAL A, which is a minuend signal with a weight of +1, is supplied to the input terminal b of the first logic gate 1, to the input terminal b of the second logic gate 2, to the input terminal g of the third logic gate 3 and to the input terminal m of the fourth logic gate 4. An inverted signal of SIGNAL A is supplied to the input terminal e of the first logic gate 1 as well as to the input terminal d of the second logic gate 2. SIGNAL B, which is a subtrahend signal with a weight of −1, is supplied to the input terminal d of the first logic gate 1 and to the input terminal c of the second logic gate 2. An inverted (signal of SIGNAL B is supplied to the input terminal c of the first logic gate 1, to the input terminal e of the second logic gate 2, to the input terminal h of the third logic gate 3 and to the input terminal n of the fourth logic gate 4. SIGNAL Xi, which is a borrow input signal with a weight of −1, is supplied to the input terminal a of the first logic gate 1. An inverted signal of SIGNAL Xi is supplied to the input terminal a of the second logic gate 2 and to the input terminal j of the fourth logic gate 4. The output terminal f of the first logic gate 1 and the output terminal f' of the second logic gate 2 are connected together in such a way as to produce a SIGNAL D which is a difference output signal with a weight of +1. The output terminal i of the third logic gate 3 and the output terminal k of the fourth logic gate 4 are connected together in such a way as to produce a SIGNAL Xo which is a borrow output signal with a weight of −2.

The truth table of FIG. 5 shows the relation between outputs of the first and second logic gates 1 and 2 in response to the input signals (SIGNALS A, B, Xi) and corresponding logic levels of SIGNAL D (the difference output signal identical with SIGNAL D of FIG. 3). The truth table of FIG. 6 shows the relation between outputs of the third and fourth logic gates 3 and 4 in response to the input signals (SIGNALS A, B, Xi) and corresponding logic levels of SIGNAL Xo (the borrow output signal identical with SIGNAL Xo of FIG. 3). "0" represents the state of low logic level and "1" represents the state of high logic level in these truth tables. Suppose an input situation where SIGNAL A="0", SIGNAL B="0" and SIGNAL Xi="0". The PMOS transistors 11, 13 and the NMOS transistors 15, 17, 19 are in the off state and, as a result, the output of the first logic gate 1 is in the state of high impedance. Each NMOS transistor 25, 28, 29 is placed into the on state and the PMOS transistor 24 turns off, as a result of which the second logic gate 2 gives an output of "0". SIGNAL D therefore becomes "0". Meanwhile, both the PMOS transistor 31 and the NMOS transistor 33 turn off and, as a result, the output of the third logic gate 3 is in the state of high impedance. Both the NMOS transistors 43 and 45 are placed into the on state and the PMOS transistor 42 turns off, so that the fourth logic gate 4 provides a "0" as its output. SIGNAL Xo becomes "0".

Figure 1:
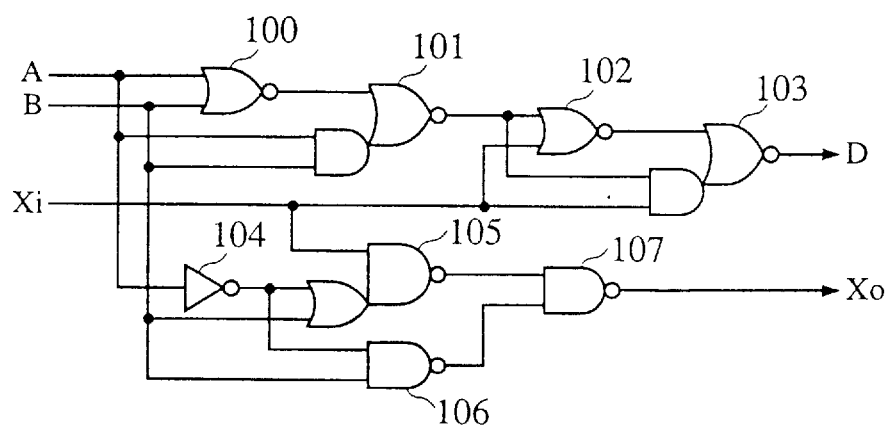
FIG. 1 is a logic diagram of a conventional full subtracter.

The length of processing time taken in a case where input signals (SIGNALS A, B, Xi) are simultaneously supplied to the full subtracter shown in FIG. 4, is explained. Inverted signals of SIGNALS A, B and Xi are produced at the same time in the inverters 5, 6 and 7, respectively. SIGNALS A, B and Xi and their inverted signals are supplied to the first to fourth logic gates 1–4. SIGNAL D is obtained in a propagation delay time required for input signal propagation through a total of two gate-stages, i.e., one inverter and one logic gate (the logic gate 1 or logic gate 2). Likewise, SIGNAL Xo is obtained in a propagation delay time required for input signal propagation through a total of two gate-stages, i.e., one inverter and one logic gate (the logic gate, 3 or logic gate 4). With SIGNALS D and Xo, the processing time of the present full subtracter of FIG. 4 is about ½ of that of the FIG. 1 prior art logic circuit. The processing rate of the FIG. 4 full subtracter is about twice that of the FIG. 1 logic circuit. One of advantages provided by the FIG. 4 configuration is that no through current flows from $V_{DD}$ to ground in any input state.

Figure 7:
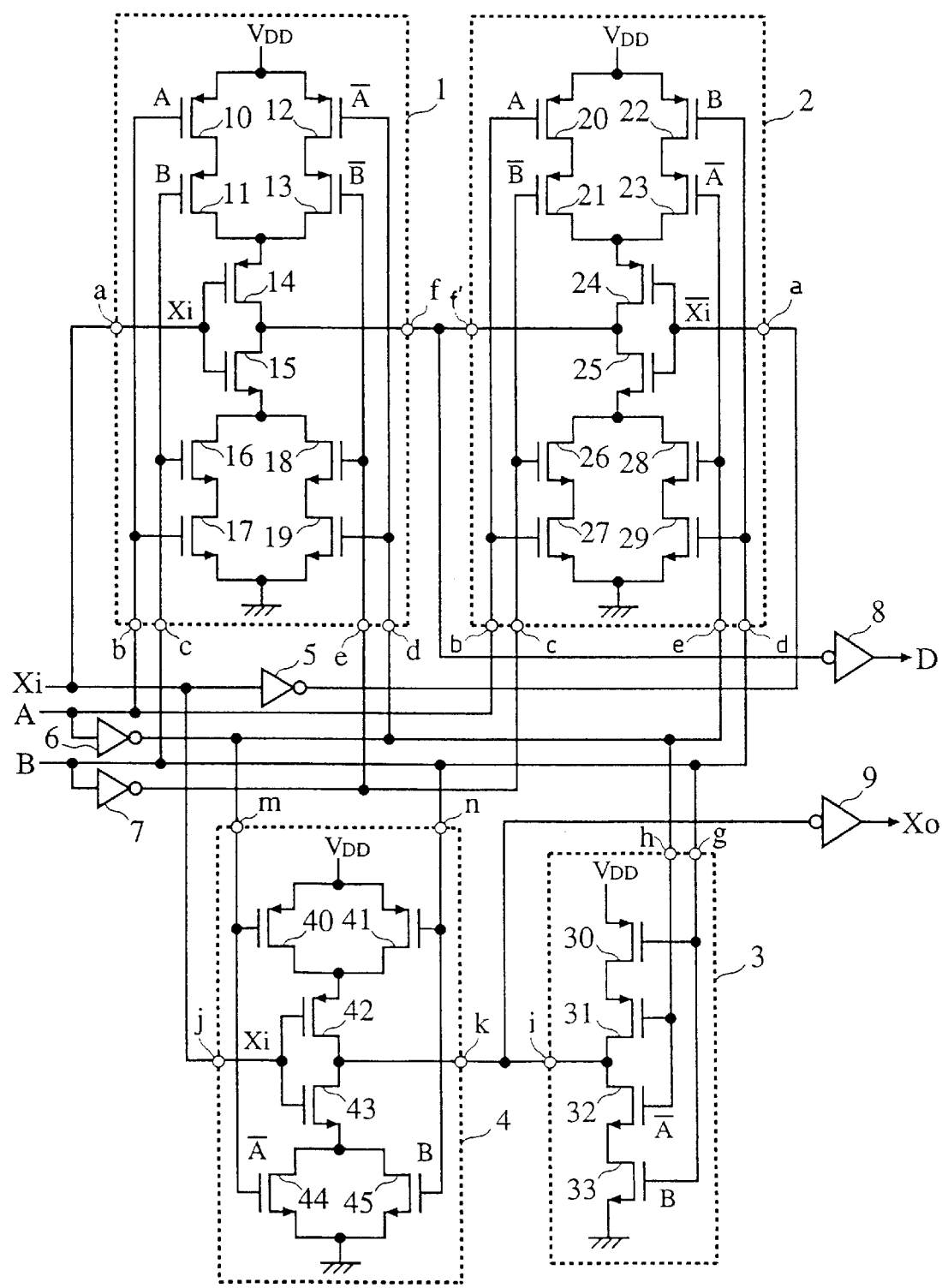
FIG. 7 is a circuit diagram of a full subtracter in accordance with another embodiment of the present invention.

A second embodiment of the present invention is described. FIG. 7 illustrates a circuit of a CMOS full subtracter which is constructed such that the logical expressions (1) and (2) hold. Like the FIG. 4 circuit, this circuit comprises the first to fourth logic gates 1–4 and the CMOS inverters 5, 6, 7. In addition to these components, two CMOS output inverters 8, 9 are provided in the present embodiment. The CMOS output inverters 8 and 9 are inverting buffers for high drive performance.

With reference to FIG. 7, SIGNAL A with a weight of +1 is supplied to the input terminal b of the first logic gate 1 and to the input terminal b of the second logic gate 2. An inverted signal of SIGNAL A is supplied to the input terminal d of the first logic gate 1, to the input terminal e of the second logic gate 2, to the input terminal h of the third logic gate 3 and to the input terminal m of the fourth logic gate 4. SIGNAL B with a weight of −1 is supplied to the input terminal c of the first logic gate 1, to the input terminal d of the second logic gate 2, to the input terminal g of the third logic gate 3 and to the input terminal n of the fourth logic gate 4. An inverted signal of SIGNAL B is supplied to the input terminal e of the first logic gate 1 and to the input terminal c of the second logic gate 2. SIGNAL Xi with a weight of −1 is supplied to the input terminal a of the first logic gate 1 and to the input terminal j of the fourth logic gate 4. An inverted signal of SIGNAL Xi is supplied to the input terminal a of the second logic gate 2. The output terminal f of the first logic gate 1 and the output terminal f' of the second logic gate 2 are connected in common to the input terminal of the output inverter 8 so that the output inverter 8 provides a SIGNAL D with a weight of +1 as its output. The output terminal i of the third logic gate 3 and the output terminal k of the fourth logic gate 4 are connected in common to the input terminal of the output inverter 9 so that the output inverter 9 provides a SIGNAL Xo with a weight of −2 as its output.

The truth table of FIG. 8 shows the relation between outputs of the first and second logic gates 1 and 2 in response to the input signals (SIGNALS A, B, Xi) and corresponding logic levels of SIGNAL D (the difference output signal identical with SIGNAL D of FIG. 3). The truth table of FIG. 9 shows the relation between outputs of the third and fourth logic gates 3 and 4 in response to the input signals (SIGNALS A, B, Xi) and corresponding logic levels of SIGNAL Xo (the borrow output signal identical with SIGNAL Xo of FIG. 3). "0" represents the low logic level and "1" represents the high logic level in these truth tables. Suppose an input situation where SIGNAL A="0", SIGNAL B="0" and SIGNAL Xi="0". The PMOS transistors 21, 23, 24 and the NMOS transistors 27, 29 are placed into the off state and, as a result, the output of the second logic gate 2 is in the state of high impedance. Each PMOS transistor 10, 11, 14 is placed into the on state and the NMOS transistor 15 turns off, as a result of which the first logic gate 1 gives an output of "1". The signal at the output terminal to which the first and second logic gates 1 and 2 are connected in common, becomes "1". This signal is inverted by the output inverter 8 to become a SIGNAL D of "0". Meanwhile, both the PMOS transistor 31 and the NMOS transistor 33 turn off and, as a result, the output of the third logic gate 3 is in the state of high impedance. Both the PMOS transistors 41 and 42 are placed into the on state and the NMOS transistor 43 turns off, so that the fourth logic gate 4 provides a "1" as its output. The signal at the output terminal to which both the third and fourth logic gates 3 and 4 are connected in common, becomes "1". This signal is inverted by the output inverter 9 to become a SIGNAL Xo of "0".

Figure 2:
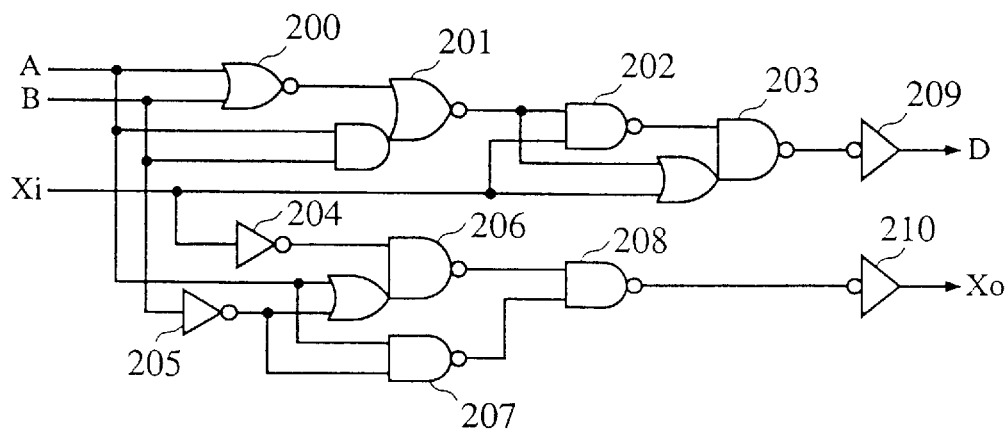
FIG. 2 is a logic diagram of another conventional full subtracter.

With SIGNALS D and Xo, the processing time of the present full subtracter of FIG. 7 is reduced in comparison with the FIG. 2 prior art logic circuit. The present invention provides a fast full subtracter with buffers. One of advantages provided by the FIG. 7 configuration is that no through current flows from $V_{DD}$ to ground in any input state.

The configuration of the logic gates 1–4 is not necessarily limited to the configuration of FIGS. 4 and 7. Any other circuit configuration may be utilized as far as the same functions are performed.

The invention claimed is:

1. A full subtracter comprising:

(a) a first logic gate;

(b) a second logic gate;

each of said first and second logic gates having a first to fifth input terminals and an output terminal;

each of said first and second logic gates producing a low-logic-level output signal, at least either in a first state in which said first, second and third input terminals receive a high logic level signal or in a second state in which said first, fourth and fifth input terminals receive a high logic level signal;

each of said first and second logic gates producing a high-logic-level output signal, at least either in a third state in which said first, second and third input terminals receive a low logic level signal or in a fourth state in which said first, fourth and fifth input terminals receive a low logic level signal;

said output terminal of each of said first and second logic gates being placed into the state of high impedance in a different state other than said first to fourth states;

(c) a third logic gate;

said third logic gate having a sixth and seventh input terminals and output terminal;

said third logic gate producing a low-logic-level output signal in a fifth state in which said sixth and seventh input terminals receive a high logic level signal;

said third logic gate producing a high-logic-level signal in a sixth state in which said sixth and seventh input terminals receive a low logic level signal;

said output terminal of said third logic gate being placed into the state of high impedance in a different state other than said fifth and sixth states;

(d) a fourth logic gate;

said fourth logic gate having an eighth to tenth input terminals and an output terminal;

said fourth logic gate producing a low-logic-level output signal, at least either in a seventh state in which said eighth and ninth input terminals receive a high logic level signal or in an eighth state in which said eighth and tenth input terminals receive a high logic level signal;

said fourth logic gate producing a high-logic-level output signal, at least either in a ninth state in which said eighth and ninth input terminals receive a low logic level signal or in a tenth state in which said eighth and tenth input terminals receive a low Logic level signal;

said output terminal of said fourth logic gate being placed into the state of high impedance in a different state other than said seventh to tenth states;

(e) means for supplying a minuend signal having a weight of +1 to said second input terminal of said first logic gate, to said second input terminal of said second logic gate, to said sixth input terminal of said third logic gate and to said ninth input terminal of said fourth logic gate;

(f) means for supplying an inverted signal of said minuend signal to said fifth input terminal of said first logic gate and to said fourth input terminal of said second logic gate;

(g) means for supplying a subtrahend signal having a weight of −1 to said fourth input terminal of said first logic gate and to said third input terminal of said second logic gate;

(h) means for supplying an inverted signal of said subtrahend signal to said third input terminal of said first logic gate, to said fifth input terminal of said second logic gate, to said seventh input terminal of said third logic gate and to said tenth input terminal of said fourth logic gate;

(i) means for supplying a borrow input signal having a weight of −1 to said first input terminal of said first logic gate; and (j) means for supplying an inverted signal of said borrow input signal to said first input terminal of said second logic gate and to said eighth input terminal of said fourth logic gate;

wherein said output terminals of said first and second logic gates are interconnected such that a difference output signal having a weight of +1 is generated and said output terminals of said third and fourth logic gates are interconnected such that a borrow output signal having a weight of −2 is generated.

2. A full subtracter according to claim 1 wherein each of said first and second logic gates comprises a first group of five MOS transistors that have a first conductivity type channel and a second group of five MOS transistors that have a second conductivity type channel, a first pair of MOS transistors of said first group being connected in series to establish a first series connection;

a second pair of MOS transistors of said first group being connected in series to establish a second series connection;

said first and second series connections being connected in parallel to form a first parallel circuit;

a third pair of MOS transistors of said second group being connected in series to establish a third series connection;

a fourth pair of MOS transistors of said second group being connected in series to establish a fourth series connection;

said third and fourth series connections being connected in parallel to form a second parallel circuit;

a fifth pair of MOS transistors, one of which is the remaining MOS transistor of said first group and the other of which is the remaining MOS transistor of said second group, being connected in series to establish a fifth series connection;

said first parallel circuit, said fifth series connection and said second parallel circuit being connected in series between a positive power supply terminal and a negative power supply terminal;

gates of said fifth MOS transistor pair being connected in common to said first input terminal;

drains of said fifth MOS transistor pair being connected in common to said output terminal;

gates of one of said first MOS transistor pair and one of said third MOS transistor pair being connected in common to said second input terminal;

gates of the other of said first MOS transistor pair and the other of said third MOS transistor pair being connected in common to said third input terminal;

gates of one of said second MOS transistor pair and one of said fourth MOS transistor pair being connected in common to said fourth input terminal; and gates of the other of said second MOS transistor pair and the other of said fourth MOS transistor pair being connected in common to said fifth input terminal.

3. A full subtracter according to claim 1 wherein said third logic gate comprises a first pair of MOS transistors that have a first conductivity type channel and a second pair of MOS transistors that have a second conductivity type channel, said first and second MOS transistor pairs being connected in series between a positive power supply terminal and a negative power supply terminal;

gates of one of said first MOS transistor pair and one of said second MOS transistor pair being connected in common to said sixth input terminal; and gates and drains of the other of said first MOS transistor pair and the other of said second MOS transistor pair being connected in common to said seventh input terminal and to said output terminal, respectively.

4. A full subtracter according to claim 1 wherein said fourth logic gate comprises a first group of three MOS transistors that have a first conductivity type channel and a second group of three MOS transistors that have a second conductivity type channel, a first pair of MOS transistors of said first group being connected in parallel to establish a parallel connection;

a second pair of MOS transistors of said second group being connected in parallel to establish a parallel connection;

a third pair of MOS transistors, one of which is, the remaining MOS transistor of said first group and the other of which is the remaining MOS transistor of said second group, being connected in series to establish a series connection;

said parallel connections and said series connection being connected in series between a positive power supply terminal and a negative power supply terminal;

gates of said third MOS transistor pair being connected in common to said eighth input terminal;

drains of said third MOS transistor pair being connected in common to said output terminal;

gates of one of said first MOS transistor pair and one of said second MOS transistor pair being connected in common to said ninth input terminal; and gates of the other of said first MOS transistor pair and the other of said second MOS transistor pair being connected in common to said tenth input terminal.

5. A full subtracter comprising:

(a) a first logic gate;

(b) a second logic gate;

each of said first and second logic gates having a first to fifth input terminals and an output terminal;

each of said first and second logic gates producing a low-logic-level output signal, at least either in a first state in which said first, second and third input terminals receive a high logic level signal or in a second state in which said first, fourth and fifth input terminals receive a high logic level signal;

each of said first and second logic gates producing a high-logic-level output signal, at least either in a third state in which said first, second and third input terminals receive a low logic level signal or in a fourth state in which said first, fourth and fifth input terminals receive a of low logic level signal;

said output terminal of each of said first and second logic gates being placed into the state of high impedance in a different state other than said first to fourth states;

(c) a third logic gate;

said third logic gate having a sixth and seventh input terminals and output terminal;

said third logic gate producing a low-logic-level output signal in a fifth state in which said sixth and seventh input terminals receive a high logic level signal;

said third logic gate producing a high-logic-level signal in a sixth state in which said sixth and seventh input terminals receive a low logic level signal;

said output terminal of said third logic gate being placed into the state of high impedance in a different state other than said fifth and sixth states;

(d) a fourth logic gate;

said fourth logic gate having an eighth to tenth input terminals and an output terminal;

said fourth logic gate producing a low-logic-level output signal, at least either in a seventh state in which said eighth and ninth input terminals receive a high logic level signal or in an eighth state in which said eighth and tenth input terminals receive a high logic level signal;

said fourth logic gate producing a high-logic-level output signal, at least either in a ninth state in which said eighth and ninth input terminals receive a low logic level signal or in a tenth state in which said eighth and tenth input terminals receive a low logic level signal;

said output terminal of said fourth logic gate being placed into the state of high impedance in a different state other than said seventh to tenth states;

(e) means for supplying a minuend signal having a weight of +1 to said second input terminal of said first logic gate and to said second input terminal of said second logic gate;

(f) means for supplying an inverted signal of said minuend signal to said fourth input terminal of said first logic gate, to said fifth input terminal of said second logic gate, to said seventh input terminal of said third logic gate and to said ninth input terminal of said fourth logic gate;

(g) means for supplying a subtrahend signal having a weight of −1 to said third input terminal of said first logic gate, to said fourth input terminal of said second logic gate, to said sixth input terminal of said third logic gate and to said tenth input terminal of said fourth logic gate;

(h) means for supplying an inverted signal of said subtrahend signal to said fifth input terminal of said first logic gate and to said third input terminal of said second logic gate;

(i) means for supplying a borrow input signal having a weight of −1 to said first input terminal of said first logic gate and to said eighth input terminal of said fourth logic gate; and (j) means for supplying an inverted signal of said borrow input signal to said first input terminal of said second logic gate;

(k) a first output inverter with an input terminal connected to a connection between said output terminals of said first and second logic gates and an output terminal at which a difference output signal having a weight of +1 is provided; and (l) a second output inverter with an input terminal connected to a connection between said output terminals of said third and fourth logic gates and an output terminal at which a borrow output signal having a weight of −2 is provided.

6. A full subtracter according to claim 5 wherein each of said first and second logic gates comprises a first group of five MOS transistors that have a first conductivity type channel and a second group of five) MOS transistors that have a second conductivity type channel, a first pair of MOS transistors of said first group being connected in series to establish a first series connection;

a second pair of MOS transistors of said first group being connected in series to establish a second series connection;

said first and second series connections being connected in parallel to form a first parallel circuit;

a third pair of MOS transistors of said second group being connected in series to establish a third series connection;

a fourth pair of MOS transistors of said second group being connected in series to establish a fourth series connection;

said third and fourth series connections being connected in parallel to form a second parallel circuit;

a fifth pair of MOS transistors, one of which is the remaining MOS transistor of said first group and the other of which is the remaining MOS transistor of said second group, being connected in series to establish a fifth series connection;

said first parallel circuit, said fifth series connection and said second parallel circuit being connected in series between a positive power supply terminal and a negative power supply terminal;

gates of said fifth MOS transistor pair being connected in common to said first input terminal;

drains of said fifth MOS transistor pair being connected in common to said output terminal;

gates of one of said first MOS transistor pair and one of said third MOS transistor pair being connected in common to said second input terminal;

gates of the other of said first MOS transistor pair and the other of said third MOS transistor pair being connected in common to said third input terminal;

gates of one of said second MOS transistor pair and one of said fourth MOS transistor pair being connected in common to said fourth input terminal; and gates of the other of said second MOS transistor pair and the other of said fourth MOS transistor pair being connected in common to said fifth input terminal.

7. A full subtracter according to claim 5 wherein said third logic gate comprises a first pair of MOS transistors that have a first conductivity type channel and a second pair of MOS transistors that have a second conductivity type channel, said first and second MOS transistor pairs being connected in series between a positive power supply terminal and a negative power supply terminal;

gates of one of said first MOS transistor pair and one of said second MOS transistor pair being connected in common to said sixth input terminal; and gates and drains of the other of said first MOS transistor pair and the other of said second MOS transistor pair being connected in common to said seventh input terminal and to said output terminal, respectively.

8. A full subtracter according to claim 5 wherein said fourth logic gate comprises a first group of three MOS transistors that have a first conductivity type channel and a second group of three MOS transistors that have a second conductivity type channel, a first pair of MOS transistors of said first group being connected in parallel to establish a parallel connection;

a second pair of MOS transistors of said second group being connected in parallel to establish a parallel connection;

a third pair of MOS transistors, one of which is the remaining MOS transistor of said first group and the other of which is the remaining MOS transistor of said second group, being connected in series to establish a series connection;

said parallel connections and said series connection being connected in series between a positive power supply terminal and a negative power supply terminal;

gates of said third MOS transistor pair being connected in common to said eighth input terminal;

drains of said third MOS transistor pair being connected in common to said output terminal;

gates of one of said first MOS transistor pair and one of said second MOS transistor pair being connected in common to said ninth input terminal; and gates of the other of said first MOS transistor pair and the other of said second MOS transistor pair being connected in common to said tenth input terminal.

* * * * *